(12) United States Patent
Gupta

(10) Patent No.: US 6,629,312 B1
(45) Date of Patent: Sep. 30, 2003

(54) PROGRAMMATIC SYNTHESIS OF A MACHINE DESCRIPTION FOR RETARGETING A COMPILER

(75) Inventor: Shail Aditya Gupta, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/378,601

(22) Filed: Aug. 20, 1999

(51) Int. Cl.$^7$ ................................................ G06F 9/45
(52) U.S. Cl. ..................... 717/136; 717/147; 703/20
(58) Field of Search ............................. 717/140, 147, 717/148, 136; 703/20

(56) References Cited

U.S. PATENT DOCUMENTS

| | | | | |
|---|---|---|---|---|
| 5,355,491 A | * | 10/1994 | Lawlor | 395/700 |
| 5,488,714 A | * | 1/1996 | Skidmore | 717/143 |
| 5,854,929 A | * | 12/1998 | Van Praet et al. | 717/156 |
| 5,918,035 A | * | 6/1999 | Van Praet | 395/500 |
| 6,226,776 B1 | | 5/2001 | Panchul et al. | 716/3 |
| 6,292,938 B1 | * | 9/2001 | Sarkar et al. | 717/138 |
| 6,463,582 B1 | * | 10/2002 | Lethin et al. | 717/158 |

OTHER PUBLICATIONS

Peter Grun et al., Expression: An ADL for System Level Design Expoloration, Sep. 1998 [retrieved on Apr. 25, 2002]. Retrieved from the Internet: <URL:http://citeseer.nj.nec.com/grun98expression.html>.*

Halambi et al., Expression: a language for architecture exploration through compiler/simula retargetability, Mar. 1999 [retrieved on Apr. 25, 2002]. Retrieved from the Internet: http://ieeexplore.ieee.org/iel4/6133/16399/00761170.pdf?is Number=16399&prod=CNF.*

Parcerisa et al., The Latency Hiding Effectiveness of Decoupled Access/Execute Processors, 1998, Universitat Poloitecnica de Catalunya, Barcelona, Spain.*

Rainer Leupers, Peter Marwedel, "Retargetable Generation of Code Selectors from HDL Processor Models," IEEE, 1997, pp. 140–144.

George Hadjiyiannis, Silvina Hanono, Srinivas Devadas, "ISDL: An Instruction Set Description Language for Retargetability," ACM, 1997, pp. 299–302.

Gyllenhaal et al., "HMDES Version 2.0 Specification," Hewlett Packard Laboratories Technical Report IMPACT–96–3, (Published before Aug. 20, 1999).

Hadjiyiannis et al., "A Methodology for Accurate Performance Evaluation in Architecture Exploration." (Published before Aug. 20, 1999).

Hoogerbrugge et al., "Automatic Synthesis of Transport Triggered Processors." (Published before Aug. 20, 1999).

Corporaal et al., "MOVE: A Framework for High–Performance Processor Design," ACM, 1991, pp. 692–701.

Corporaal et al., "Cosynthesis with the MOVE Framework." (Published before Aug. 20, 1999).

(List continued on next page.)

*Primary Examiner*—Kakali Chaki
*Assistant Examiner*—Todd Ingberg

(57) ABSTRACT

An MDES extractor automatically extracts a machine description (MDES) for re-targeting a compiler from a structural representation of a datapath of an explicitly parallel instruction computing (EPIC) processor. The datapath is a machine readable data structure that specifies the functional unit instances and an interconnect of the functional unit instances to registers. The MDES extractor structurally traverses the interconnect, identifying resource conflicts among the operations in the processor's opcode repertoire. Latencies and internal resources of the opcodes associated with the functional unit instances are obtained from a macrocell library. The MDES extractor then identifies external resource conflicts by preparing reservation tables for the functional units.

18 Claims, 9 Drawing Sheets

OTHER PUBLICATIONS

Lanneer et al, "Chapter 5—Chess: Retargetable Code Generation for Embedded DSP Processors," Code Generation for Embedded Processors, Kluwer Academic Publications, pp. 85–102. (Published before Aug. 20, 1999).

Fauth, "Chapter 8—Beyond Tool–Specific Machine Descriptions," Code Generation for Embedded Processors, Kluwer Academic Publications, pp. 138–152. (Published before Aug. 20, 1999).

Shackleford et al., "Satsuki: An Integrated Processor Synthesis and Compiler Generation System," IEICE Special Issue on Synthesis and Verification of Hardware Design, 10–96.

Chaitin, G.J., "Register Allocation & Spilling Via Graph Coloring," ACM, 1982.

Aditya et al., "Elcor's Machine Description System: Version 3.0," HPL–98–128, Oct. 1998, pp. 1–75.

Rau et al., "Machine–Description Driven Compilers for EPIC Processors," HP Laboratories Technical Report, HPL–98–40, Sep. 1998, pp. 1–82.

Kathail et al., "HPL PlayDoh Architecture Specification: Version 1.0," HP Laboratories Technical Report, HPL–93–80, Feb. 1994, pp. 1–48.

* cited by examiner

FIG. 5

I/O Specification

| Semantics | Opcode | Source 1 | Source 2 | Destination |
|---|---|---|---|---|
| Integer Add | IADD_00 | {I0} | {I0} | {I0} |
|  | IADD_01 | {I0} | {I0} | {I0,I1} |
|  | IADD_10 | {I1} | {I1} | {I0,I1} |
|  | IADD_11 | {I1} | {I1} | {I1} |
| Integer Multiply | IMUL_00 | {I0} | {I0} | {I0} |
|  | IMUL_10 | {I1} | {I1} | {I1} |
| Copy | IMOV_01 | {I0} | — | {I0,I1} |
|  | IMOV_10 | {I1} | — | {I0,I1} |

FIG. 6A
IADD_01

| Cycle | 427a | 427b | 423 | 425 |
|---|---|---|---|---|
| 0 | x | x | | |
| 1 | | | x | |

FIG. 6B

| Cycle | 427a | 427b | 423 | 425 |
|---|---|---|---|---|
| 0 | x | x | | |
| 1 | | | | x |

FIG. 6C
IADD_10

| Cycle | 429a | 429b | 423 | 425 |
|---|---|---|---|---|
| 0 | x | x | | |
| 1 | | | x | |

FIG. 6D

| Cycle | 429a | 429b | 423 | 425 |
|---|---|---|---|---|
| 0 | x | x | | |
| 1 | | | | x |

FIG. 6E
COMPOSITE

| Cycle | 427a | 427b | 429b | 429b | 423 | 425 |
|---|---|---|---|---|---|---|
| 0 | x | x | | | | |
| 1 | | | | | x | |

| Clock Cycle | A | B | C | D | Result |
|---|---|---|---|---|---|
| 0 | x | x | | | |
| 1 | | | x | | A*B |
| 2 | | | | x | A*B+C |

| Clock Cycle | A | B | D |
|---|---|---|---|
| 0 | x | x | |
| 1 | | | x |

FIG. 10A  "Pr ? gpr, gpr: gpr"

| Cycle | Resource Usages ||||| |
|---|---|---|---|---|---|---|
| | ALU | pr0 | dr0 | dr1 | dw0 | lit |
| 0 | X | | X | X | | |
| 1 | | X | | | | |
| 2 | | | | | X | |

FIG. 10B  "Pr ? gpr, s: gpr"

| Cycle | Resource Usages ||||| |
|---|---|---|---|---|---|---|
| | ALU | pr0 | dr0 | dr1 | dw0 | lit |
| 0 | X | | | X | | X |
| 1 | | X | | | | |
| 2 | | | | | X | |

FIG. 11

SQRT Opcode Reservation Table

"Pr ? gpr : gpr"

| Clock Cycle | SQRT | dr1 | dw0 |
|---|---|---|---|
| 0 | X | X | |
| 1 | X | | |
| 2 | X | | |
| 3 | X | | X |

1021, 1023, 1024

PROGRAMMATIC SYNTHESIS OF A MACHINE DESCRIPTION FOR RETARGETING A COMPILER

RELATED APPLICATION DATA

This patent application is related to the following co-pending U.S. patent applications, commonly assigned and filed concurrently with this application:

U.S. patent application Ser. No. 09/378,596, entitled AUTOMATIC DESIGN OF PROCESSOR DATAPATHS, by Shail Aditya Gupta and Bantwal Ramakrishna Rau (referred to as the Datapath Application);

U.S. patent application Ser. No. 09/378,293, entitled AUTOMATIC DESIGN OF VLIW INSTRUCTION FORMATS, by Shail Aditya Gupta, Bantwal Ramaktishna Rau, Richard Craig Johnson, and Michael S. Schlansker;

U.S. patent application Ser. No. 09/378,394, entitled AUTOMATED DESIGN OF PROCESSOR INSTRUCTION UNITS, by Shail Aditya Gupta and Bantwal Ramakrishna Rau (referred to as the Control path application);

U.S. patent application Ser. No. 09/378,395, entitied AUTOMATIC DESIGN OF VLIW PROCESSORS, by Shail Aditya Gupta, Bantwal Ramakrishna Rau, Vinod Kumar Kathail, and Michael S. Schlansker; and U.S. patent application Ser. No. 09/378,290, entitled AUTOMATED DESIGN OF PROCESSOR SYSTEMS USING FEEDBACK FROM INTERNAL MEASUREMENTS OF CANDIDATE SYSTEMS, by Michael S. Schlansker, Vinod Kumar Kathail, Greg Snider, Shail Aditya Gupta, Scott A. Mahlke and Santosh G. Abraham.

The above patent applications are hereby incorporated by reference.

TECHNICAL FIELD

The invention pertains to the programmatic extraction of a processor machine description for use in retargeting a compiler.

BACKGROUND

Explicitly Parallel Instruction Computing (EPIC) processors are a class of processors in which instruction level parallelism (ILP) is explicitly encoded in the processor's instructions. One form of EPIC processor is a very long instruction word (VLIW) processor. Throughout this document, references to a VLIW processor are intended to broadly encompass EPIC processors.

EPIC processors exploit instruction-level parallelism (ILP) by issuing several operations per instruction to multiple functional units. In creating an EPIC processor, the processor designer creates a structural description of the processor's datapath and control path. The datapath includes the functional units for executing operations, registers for storing the inputs and outputs of the operations, and the interconnect circuitry (buses, tri-states, multiplexors, etc.) for transferring data between the functional units and register files. The control path provides control signals to the control ports in the datapath based on a program, which is either read from memory or hardwired into the control logic.

In designing an EPIC processor, a number of cost/performance trade-offs need to be made. Each of these trade-offs can have a substantial impact on the overall system cost and performance. Unfortunately, designing a VLIW processor today is a fairly cumbersome manual process which must carefully weigh cost and performance tradeoffs in the light of resource sharing and timing constraints of the given micro-architecture. Optimizations and customizations of the processor, if any, with respect to a set of applications or an application domain must also be determined and applied manually.

The design space of an EPIC processor is enormous and the cost of exploring various designs is so huge that most designers make only incremental modifications to an existing processor design. This approach has the disadvantage that it typically leads to a locally optimal design while ignoring superior designs that may be radically different or require a large amount of quantitative exploration.

Due to the limitations of the manual design process, automated design software provides the potential to explore a wider range of processor designs more effectively. One tool that is helpful in assessing the merits of a particular processor design is a re-targetable compiler. A re-targetable compiler is a type of compiler that can be readily targeted to a processor design by providing sufficient details about the machine to adapt the compiler to that machine. One principle advantage of a re-targetable compiler is that it allows the user to evaluate the merits of a particular machine design while the structural details of the machine are still in flux. This attribute is particularly useful in the design of an application Specific Instruction Set (ASIP) processor. In this context, the re-targeted compiler can generate operation issue statistics for an application program of interest running on a processor that is still being designed.

While in theory, a re-targetable compiler is a useful tool in evaluating a processor design, it is still a cumbersome process to provide the machine details necessary to re-target the compiler. Unless a compiler can be re-targeted efficiently, the advantages it provides may be outweighed by the inefficiencies associated with the re-targeting process.

SUMMARY OF THE INVENTION

The invention provides a method for automatic and programmatic extraction of a machine description suitable to re-target a compiler. One aspect of the invention is a method for extracting such a machine description programmatically from a structural description of an EPIC processor's datapath. This method is implemented as part of a system that automatically generates a structural description of a VLIW processor from an abstract Instruction Set Architecture (ISA) specification of the processor. Within this system, the method may be used to extract a machine description for re-targeting a compiler from the abstract ISA and from a structural representation of the datapath. In addition, it may use additional information about the processor, such as its instruction format or its structural control path design, to further refine the machine description.

The system implementation includes a module referred to as an MDES extractor that programmatically extracts a machine description in a format called MDES. The MDES extractor reads selected data from a machine-readable input specification, including a structural representation of a datapath, and identifies resource sharing constraints among operations in the processor's opcode repertoire during a structural traversal of the datapath. The MDES extractor constructs a specification of resource constraints in the form of reservation tables that indicate resources required by an opcode as a function of the number of clock cycles elapsed after issuing the opcode. The MDES extractor also gathers other information about the processor's operations including their input/output (I/O) storage resources where the operands of the operations reside. The resulting MDES provides information to re-target a compiler to the processor being designed.

Additional features and advantages will become apparent in the following detailed description and accompanying drawings.

BRIEF DESCRIPTION OF THE DRAWINGS

FIG. 5 is a processor I/O specification for the datapath of FIG. 4.

FIGS. 6A–B are alternative resource reservation tables for an ADD operation executed in a functional unit shown in FIG. 4. FIGS. 6C–D are alternative resource reservation tables for another ADD operation executed in another functional unit shown in FIG. 4. FIG. 6E illustrates a composite reservation table formed from the reservation tables shown in FIGS. 6A–D during the scheduling process.

FIGS. 10A–B are two distinct operation format and reservation table combinations for the ALU shown in FIG. 9.

FIG. 11 is a reservation table for a SQRT operation.

DETAILED DESCRIPTION

Figure 1:
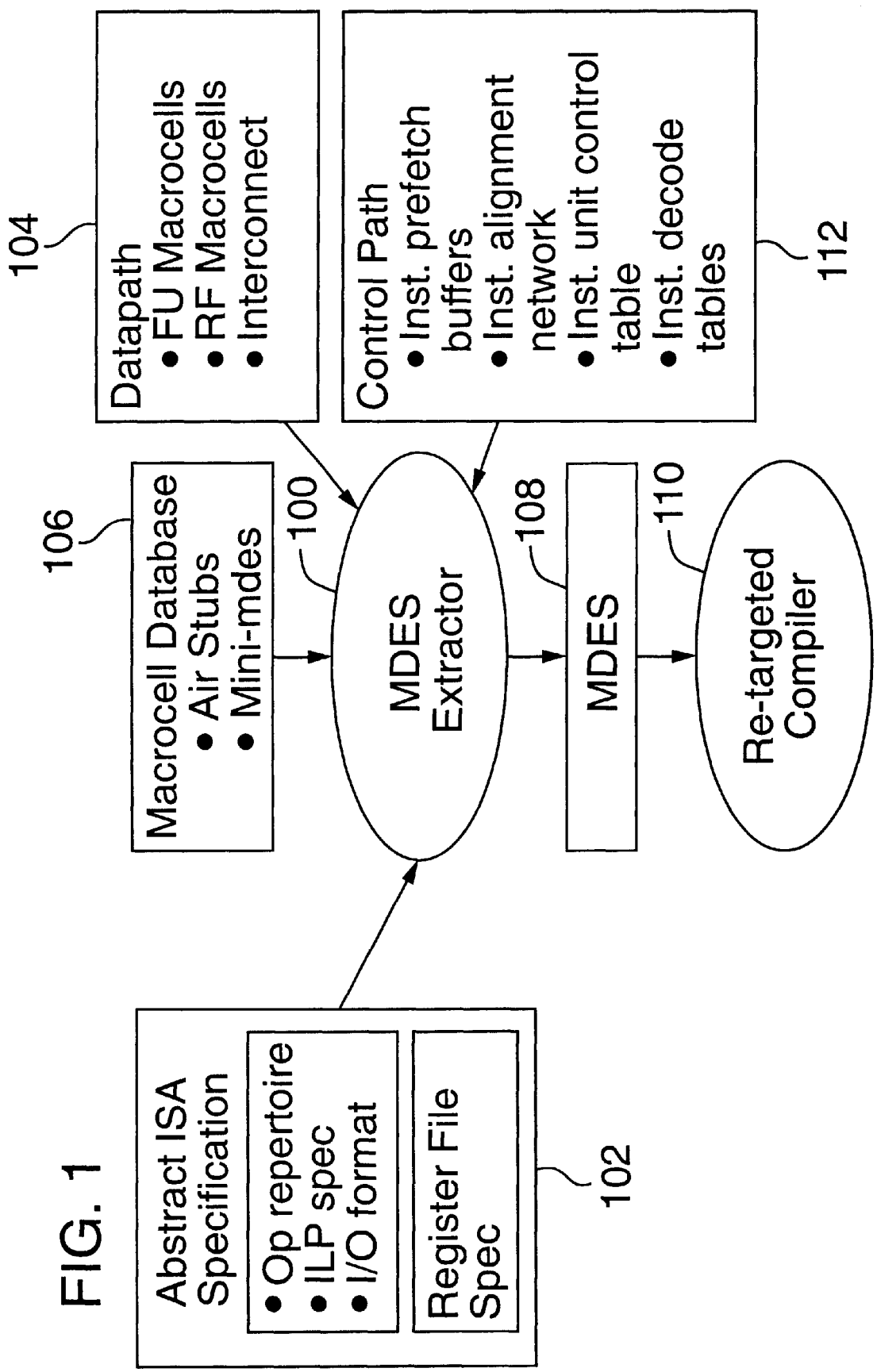
FIG. 1 illustrates an MDES extractor module that extracts a machine description for re-targeting a compiler from an abstract ISA specification and structural datapath specification of a processor.

Before describing an implementation of the MDES extractor, we begin with definitions of terms used in the following description.

Definitions

VLIW

VLIW refers to very long instruction word processors. In the context of this document, VLIW also refers more generally to an explicitly parallel instruction computing (EPIC) architecture that explicitly encodes multiple independent operations within each instruction.

Operation Set

An operation set is a set of opcodes that are mutually exclusive. The ability to represent opcodes in an operation set is only a convenience and is not required to implement the system. While each operation set can consist of a single opcode, it is more convenient to specify opcodes with similar properties as a set. This approach simplifies the input specification because the user (or another program module) need only specify desired concurrency and/or exclusion relationships among sets of operations, as opposed to each individual operation. Though not required, the opcodes in an operation set may share similar properties, such as latency and data type. For example, integer arithmetic operations such as ADD and SUBTRACT might be organized in an operation set. In the description that follows, we use the notation, ops ( ) to represent an operation set in textual form.

Operation Group

An operation group is an instance of an operation set. Operation groups make it possible to specify that multiple instances of the same operation be issued concurrently. For example, one may want a processor to be able to execute three integer ADD operations concurrently. Thus, the designer could specify that the input specification will include three operation groups, each representing an instance of the operation set, ops (ADD SUB).

Operation Group Occurrence

An operation group occurrence is an occurrence of an operation group in a particular concurrency set. The operation group occurrence enables the processor designer to identify concurrency relationships among operation groups explicitly in the input specification. For example, consider an operation group that is an instance of ops (ADD SUB). This operation group may be issued concurrently with many different combinations of operation groups. In order to specify these concurrency relationships, the input specification allows a different "occurrence" of the same operation group to be member of each of these concurrency sets.

Concurrency Set

A concurrency set is a set of operation group occurrences that may be issued concurrently.

Exclusion Set

An exclusion set is a set of operation group occurrences that are mutually disjoint. In other words, the exclusion set specifies a set of operation groups, each having operations that cannot be executed concurrently with any of the operations in each of the other groups in the exclusion set.

Abstract Instruction Set Architecture Specification

An Abstract Instruction Set Architecture (ISA) Specification is an abstract specification of a processor design and may include the following:

- an opcode repertoire, possibly structured as operation sets;
- a specification of the I/O format for each opcode;
- a register file specification, including register file types and the number of each type;
- a specification of the desired ILP constraints, making use of some form of concurrency sets, exclusion sets or a combination of concurrency and exclusion sets, that specifies which sets of operation groups/opcodes can be issued concurrently; and
- other optional architecture parameters, e.g., presence/absence of predication, speculation, etc.

There are a variety of ways to represent the ILP constraints. The user (or another program module) may specify the desired ILP by specifying exclusion and concurrency relationships among operation group occurrences. One way to specify exclusion and concurrency relationships is to construct a data structure representing AND-OR relationships among operation group instances, such as a multi-level AND-OR tree. In such a structure, an AND relationship represents a concurrency relationship among operation group occurrences. Conversely, an OR relationship represents an exclusion relationship among operation group occurrences. Another way to specify exclusion and concurrency relationships is through a graph data structure where the nodes represent operation group occurrences, for example, and the edges connecting the nodes represent exclusion or concurrency relationships among the nodes. Yet another way is to specify pairwise exclusions between operation group occurrences.

Register File Specification

A register file specification of a processor includes a list of the processor's register files specifying their types and the number of registers in each file. It also includes a correspondence between each operand instruction field type and a register file.

ArchSpec

The ArchSpec is a textual, external file format for the Abstract ISA specification. The ArchSpec may be converted to an abstract ISA spec data structure, which is then processed further to synthesize a processor design. While the specific format of the ArchSpec is a textual file, it is not critical that the input be specified in this form. For example, the input could be specified via a graphical user interface and converted into an abstract ISA data structure.

Macrocell Library

A macrocell library is a collection of hardware components specified in a hardware description language. It includes components such as gates, multiplexors (MUXes), registers, etc. It also includes higher level components such as ALUs, multipliers, register files, instruction sequencers, etc. Finally, it includes associated information used for synthesizing hardware components, such as a pointer to a synthesizable VHDL/Verilog code corresponding to the component, and information for extracting a machine description (MDES) from the functional unit components.

In the current implementation, the components reside in a macrocell database in the form of Architecture Intermediate Represenation (AIR) stubs. During the design process, various program modules instantiate hardware components from the AIR stubs in the database.

Architecture Intermediate Representation

The Architecture Intermediate Representation (AIR) is a hardware description language in a machine-readable form. The form of AIR used is similar to VHDL, but is implemented in a computer language that makes hardware components described in AIR format easier to manipulate with the program routines.

AIR provides a number of $C^{++}$ classes that represent hardware components such as registers, ports and wiring. An AIR design consists of objects instantiated from these classes. For example, an AIR representation of a processor may include a number of macrocell objects representing hardware components such as various functional units, registers, FIFO buffers, multiplexors, tri-state buffers, and wiring. Each of the macrocells may have a number of control and data ports in AIR format and may be interconnected via an AIR wiring data structure.

Data Path Specification

The data path specification is a data structure specifying functional units, register files and interconnections between the data ports of the functional units and register files. The data path also specifies control ports, such as the opcode inputs of the functional units and the register file address inputs.

In the implementation, the data path specification is a set of related object instantiations in AIR format, enumerating the macrocell instances of functional units and their interconnect components, such as multiplexors, tri-state buffers, buses, etc.

For information about the datapath specification and programmatic methods for designing the datapath, see the Datapath application, referenced above.

Instruction Format Specification

The instruction format (IF) specification is a data structure specifying the instruction fields of the instructions executed in the processor, including the opcodes, source operand(s) and destination operand(s). In some processor designs, the IF specification may include additional bit specifiers that control the data path, such as multiplexor selector bits, and an instruction identifier (e.g., a field that identifies the instruction template).

In addition to enumerating these fields, the IF specification assigns bit positions and encodings to each of them. The bit positions are specific positions that each field occupies in an instruction. For example, each instruction is typically comprised of several fields that each occupies a contiguous or non-contiguous group of one or more bit positions.

For information about the instruction format and programmatic methods for designing the instruction format, see the Instruction Format application, referenced above.

Instruction Unit

The instruction unit includes a control path and an instruction sequencer. The control path has three principal components: 1) the data path of an instruction from the instruction cache to instruction decode logic (the IUdatapath), 2) the control logic for controlling the IUdatapath, and 3) the instruction decode logic for decoding each instruction.

In the current implementation, the IUdatapath starts at the instruction cache and ends at an instruction register that interfaces with the instruction decode logic. It includes instruction prefetch buffers and an instruction alignment network for aligning the instruction in the instruction register. Connected between the sequencer and IUdatapath, the IU control logic is combinational logic used to control the instruction prefetch buffers, and the alignment network.

The control logic also provides information to the instruction sequencer that is used to initiate the fetching of the next instruction packet from the I-cache. For example in the current implementation, the control logic processes information from the instruction that specifies the width of the current instruction and indicates whether the next instruction is aligned to a known address boundary (e.g., an instruction packet boundary). The width of the current instruction is derived from an instruction identifier called the template ID. The packet boundary information is specified in the instruction as a consume-to-end-of-packet bit indicating whether the next instruction directly follows the current instruction or starts at the next packet boundary. This bit is used to align certain instructions (e.g., branch targets) to known address boundaries. The instruction may also include spare bits that encode the number of no-op cycles to follow the current instruction.

The control specification is a data structure specifying the various buffers, multiplexors, registers and control logic that form the control path. The prefetch buffers and alignment network are represented in the form of instances of AIR macrocells. The IU control logic and decode logic are expressed in the form of logic tables.

For information about the control path and programmatic methods for designing the control path, see the Control Path application, referenced above.

Instruction Sequencer

The instruction sequencer is the control logic that interfaces with the control logic of the IUdatapath and specifies the sequence of instructions to be fetched from the instruction cache. It manages a memory address register (MAR) that holds the memory address of the next instruction to be fetched from the instruction cache, and the Program Counter, identifying the next instruction to be executed in the processor. The control ports of the sequencer interface with the control ports of the IUdatapath control logic. The sequencer is also responsible for interfacing with the branch functional unit and managing events such as interrupts and exceptions.

Programmatic

The term "programmatic" means performed by a program implemented in either software or hardware. The MDES extractor described below is implemented in a program stored on a computer readable medium. A computer readable medium is a generic term for memory devices commonly used to store program instructions and data in a computer and for memory devices used to distribute programs (e.g., a CD-ROM).

A computer executes the MDES extractor from the computer readable medium. The program's input includes computer readable data structures representing the abstract ISA specification, the datapath, and the macrocell library and the output is the processor's MDES. The MDES extractor is implemented in the C$^{++}$ programming language. While the software may be ported to a variety of computer architectures, the current implementation executes on a PA-RISC workstation or server running under the HP-UX 10.20 operating system.

The MDES Extractor

The MDES extractor programmatically generates a description of a processor suitable for re-targeting a compiler. This description includes the operation repertoire of the target machine, the input/output storage resources where the operands of each operation reside, sharing constraints among hardware resources used during execution of an operation such as register file ports and buses and their timing relationships that are expressed as a reservation pattern.

FIG. 1 illustrates an MDES extractor module that programmatically extracts a machine description for re-targeting a compiler. In the process of extracting an MDES, the extractor 100 may obtain information from an abstract ISA specification 102, a structural datapath specification of a processor 104, and a macrocell database 106. The abstract ISA specification provides the operation repertoire of the target machine, an ILP specification, the I/O format of the operations in the repertoire, and a register file specification. The ILP specification identifies the ILP constraints among the operations in terms of concurrency and/or exclusion sets.

The extractor 100 creates a machine description 108 of a target processor from the structural description of the processor's datapath provided in the datapath specification 104. In the current implementation, the MDES is in the form of a database language called HMDES Version 2 that organizes information into a set of interrelated tables called sections containing rows of records called entries, each of which contain zero or more columns of property values called fields. For more information on this language, see John C. Gyllenhaal, Wen-mei W. Hwu, and B. Ramakrishna Rau. HMDES version 2.0 specification. Technical Report IMPACT-96-3, University of Illinois at Urbana-Champaign, 1996.

The MDES 108 provides information to re-target a compiler 110 to a target processor. The form of HMDES enables the use of a "table driven" compiler that has no detailed assumptions about the structure of the processor built into its program code. Instead, it makes queries to the machine description database containing the MDES of the target processor. For more information about the re-targetable compiler and MDES, see B. Ramakrishna Rau, Vinod Kathail, and Shail Aditya. Machine-description driven compilers for EPIC processors. Technical Report HPL-98-40, Hewlett-Packard Laboratories, September 1998; and Shail Aditya, Vinod Kathail, and B. Ramakrishna Rau. Elcor's Machine Description System: Version 3.0. Technical Report HPL-98-128, Hewlett-Packard Laboratories, October, 1998, which are hereby incorporated by reference.

The datapath specification may be specified manually. However, in the current implementation, the extractor 100 is part of an automated design system that programmatically generates the datapath specification from the abstract ISA specification. The datapath design process uses a textual version of the abstract ISA called the ArchSpec to generate a structural description of the datapath using hardware components from the macrocell database 106. The macrocells are in AIR format and point to actual HDL descriptions. In addition, each macrocell has a corresponding MDES information, referred to as a mini-MDES. The mini-MDES provides the operation repertoire of each macrocell, its latency, internal resource constraints and input/output port usage.

The datapath design process instantiates functional unit macrocells from the macrocell database that together can implement all operations specified in the ArchSpec subject to the ILP constraints. The datapath design process then synthesizes the register files from the ArchSpec by determining the number of input and output ports needed by the functional units based on their input and output operand connectivity and the ILP constraints. Finally, the datapath design process connects the register files and functional units via buses, multiplexors, and tri-state elements according to their input and output requirements.

The extractor 100 synthesizes the overall MDES of the target processor by combining the mini-MDES information from each of the functional units during a structural traversal of the datapath specification 104.

For each functional unit macrocell, its mini-MDES from the database is instantiated and added to the target MDES. The actual input/output connectivity of each operation present in the mini-MDES is determined by structurally traversing the corresponding input/output ports of the macrocell until a register file port or a literal port is encountered. For each multiplexor output feeding into an input port of a functional unit, all its input signals are explored as alternatives, and vice versa for the output ports. All shared resources, such as register file ports, that are encountered during the traversal are identified and added as additional columns to the reservation table of the operation with an appropriate time of use. The time of use is determined by taking into account the latency of the operation that is provided in the operation's mini-MDES and any pipeline latches encountered during the structural traversal. In this manner the composite reservation pattern of each alternative of the operation is built by combining information from the mini-MDES and the structural connectivity of the target machine. Finally, additional resource parameters, such as the number of registers in the register files, their widths and presence of speculation tag bits etc. is also recorded in the overall mdes by examining the appropriate components of the target architecture. This completes the target mdes synthesis which can then be used to drive the compiler.

The extractor may also augment the MDES with operation issue conflicts stemming from the instruction format by traversing a structural description of the control path 112.

Structure of the MDES

Figure 2:
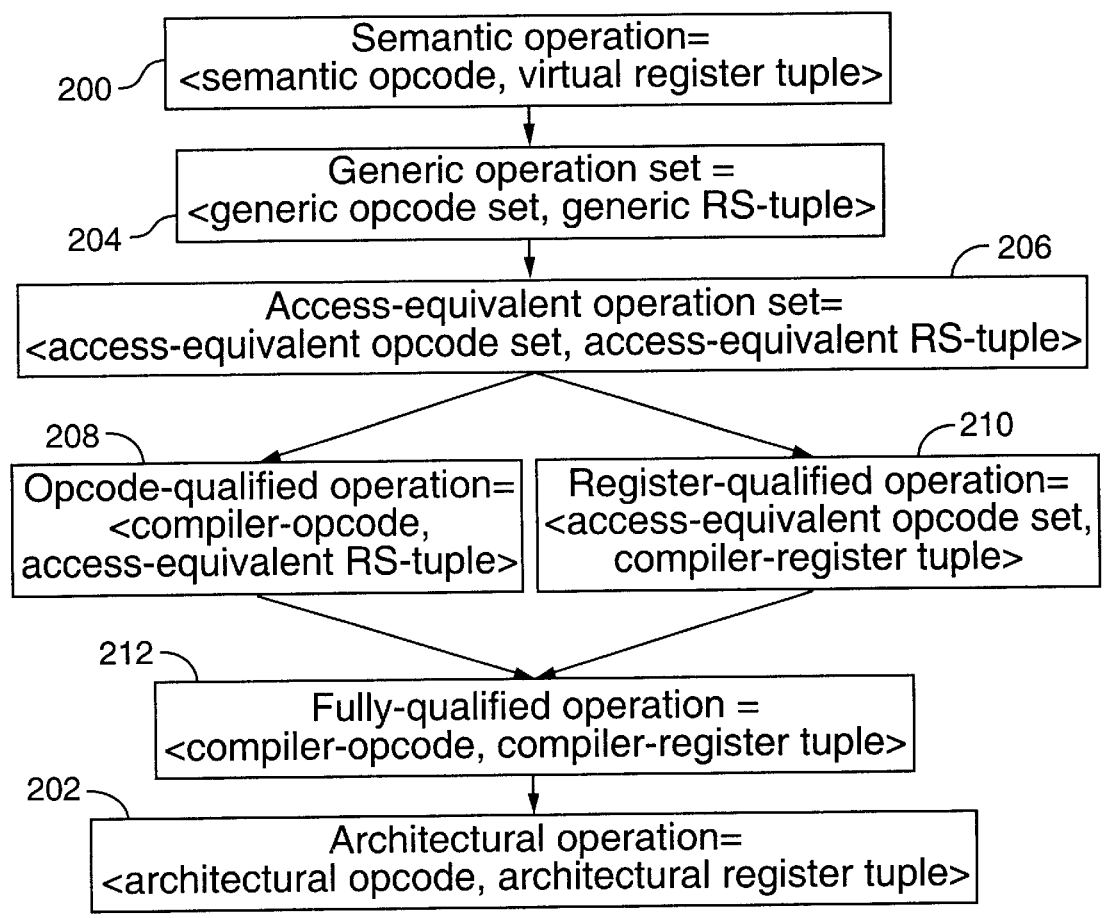
FIG. 2 illustrates an operation hierarchy data structure that a re-targetable compiler uses to bind operations within a program from the semantic level to the architectural level.

In the current implementation, the MDES includes the following information:

Operation hierarchy—As shown in FIG. 2, the operations visible to the compiler are organized in a hierarchy starting from the semantic operations (200)(present in the program) consisting of semantic opcodes and virtual registers, down to the architectural operations (202)(implemented by the target machine) consisting of architectural opcodes and physical registers. The intermediate levels include generic operations (204), access-equivalent operations (206), opcode-qualified operations (208), register-qualified operations (210), and fully-qualified operations (212) that are organized in a partial lattice called the Operation Binding Lattice. This hierarchy abstracts the structural aspects of the machine and allows the compiler to successively refine the binding of operations within the program from the semantic level to the architectural level making choices at each level that are legal with respect to the target machine. The terms used in the operation hierarchy are defined as follows:

Architectural Operations—Architectural operations are commands performed by the target processor.

Semantic Operations—Semantic operations are operations present in the source program each with a predefined meaning (e.g, ADD performs the signed binary add operation).

Architectural Registers—Architectural registers are either literals or registers in the target processor.

Virtual Registers—A virtual register is a machine independent representation of a variable present in the source program.

Compiler-registers—A compiler register is either a single architectural register or a set of architectural registers, with a fixed spatial relationship, that are viewed as a single entity by the compiler.

Generic Register Sets—A generic register set is a maximal set of compiler-registers that have the same storage attributes.

Access Equivalent register sets—In general, the phrase "access equivalent" refers to a set of processor resources that are equivalent with respect to their structural accessibility. Informally, registers are "access equivalent" if they have similar resource usage patterns, latency, and instruction format constraints. To describe how this concept is specifically used in our MDES, it is necessary to explain a few other terms. An "alternative" in this context refers to a triple consisting of a "compiler opcode" (see below), a "latency descriptor" (see below) and a "reservation table" (see below) that are jointly valid for a target processor. A "register set tuple" (RS tuple) is a tuple of register sets, such that each register set is a subset of a single generic register set (i.e. all the registers have the same storage attributes). An "access-equivalent RS tuple" corresponding to a given alternative is a maximal RS tuple, where each register set correponds to one of the operands of the compiler opcode and every register tuple in the Cartesion product of the register sets is jointly valid with that alternative, taking into account both the connectivity constraints of the processor as well as the instruction format constraints. Each register set in the access-equivalent RS tuple is an "access equivalent register set."

For every choice of the register tuple in the access equivalent RS tuple, along with the compiler opcode of the alternative, the resulting operation has the same latency descriptor and the same resource reservation table, since all of the register tuples are accessible with the same alternative. Consequently, each access equivalent register set contains registers that are interchangeable with respect to that opcode after scheduling has taken place; any register can be used in place of any other without any impact on the correctness of a scheduled piece of code. Also, since all register tuples implied by an access equivalent-tuple are architecturally valid, the compiler register for each operand can be independently selected by a register allocator in the compiler.

Compiler Opcodes—A compiler opcode is an abstraction over architectural opcodes, and is implemented by one or more architectural opcodes. This abstraction provides a more convenient way of representing an operation in the compiler. For example, a register-to-register copy may be implemented in the machine by either adding zero or multiplying by one. It is more convenient to represent this copy operation in the compiler as a single compiler opcode, rather than the specific architectural opcode or a set of opcodes that implement it in the target processor.

Generic Opcode Set—A generic opcode set is the maximal set of compiler opcodes that implement the same function, e.g., integer add.

Access Equivalent Opcode Set—An access equivalent opcode set is the maximal set of compiler-opcodes that are part of the same generic opcode set (i.e. implement the same function) and for each of which there is an alternative that yields the same access equivalent RS-tuple.

Operation descriptors—Operations at each level of the hierarchy are characterized by several properties that are also recorded within the MDES. These include the following.

Operation formats—Along with each operation, the MDES records the sets of registers and literals that can source or sink its various input or output operands respectively. A tuple of such sets, one for each operand, is called the operation format. The size of these sets becomes larger as we climb the operation hierarchy, ranging from the exact set of registers accessible from each macrocell port implementing an operation at the architectural level to a set of virtual registers containing all architectural registers at the semantic level.

Latency descriptors—Each input and output operand of an operation specifies a set of latencies associated with its sample and production times respectively relative to the issue time of the operation. In addition, a few other latencies may be recorded based on the semantics of the operation (e.g., branch latency, or memory latency). These latencies are used during operation scheduling to avoid various kinds of timing hazards.

Resources and reservation tables—The various macrocells present in the datapath, the register file ports, and the interconnect between them are hardware resources that various operations share during execution. Other shared resources may include operation issue slots within the instruction register, pipeline stages or output ports within the macrocells. Each operation within the MDES carries a table of resources, called a reservation table, that records the resources it needs at the appropriate cycle times. This table is used during operation scheduling to avoid structural hazards due to sharing of resources.

Opcode descriptors—The structural and semantic properties of opcodes at each level of the hierarchy are also kept within the MDES. These properties include the number of input and output operands, whether or not the opcode can be speculated and/or predicated, whether or not it is associative, commutative etc.

Register descriptors—Similarly, several properties of registers and register files are recorded at each level of the operation hierarchy including the bit-width, whether or not speculative execution is supported, whether the register (or register file) is static, rotating, has literals etc.

Phases of the Re-Targetable Compiler

Before describing MDES extraction in more detail, it is helpful to begin by explaining the compiler's view of the target processor. The compiler needs to know, for each opcode, which registers can be accessed as each of its source and destination operands. Additionally for an EPIC processor, the compiler needs to know the relevant operand latencies and the resource usage of these operations. With the compiler's needs in mind, the MDES serves the following two needs: 1) To assist in the process of binding the operations and variables of the source program to machine operations by presenting an abstract view of the underlying machine connectivity, and 2) to provide the information associated with each operation needed by the various phases of the compiler.

The re-targetable compiler maps the source program's operations to the processor's architectural operations.

The re-targetable compiler used with the current implementation of the MDES extractor performs this mapping in the following phases:

1. code selection;
2. pre-pass operation binding;
3. scheduling;
4. register allocation and spill code insertion;
5. post pass scheduling; and
6 code emission.

Each phase successively refines and narrows down the options available for either opcodes, registers, or both, finally yielding architectural operations that can be executed by the processor. These options are represented in a hierarchical data structure called the operation binding lattice shown in FIG. 2. Note that semantic and architectural operations (200, 202) are shown in the figure, but they are not part of the lattice. They are used to show "implementation relationships"; semantic operations (200) are implemented by generic operation sets (204) and architectural operations implement fully-qualified operations (212).

The following sections describe how the re-targetable compiler uses the MDES to map semantic operations to architectural operations.

Code selection—The code selection phase maps semantic operations (200) to generic operation sets (204), i.e., it maps semantic opcodes and virtual registers to generic opcode sets and generic register sets, respectively. Note that the mapping from semantic opcodes to generic opcodes is not, in general, one-to-one.

Pre-pass operation binding—At this point, the generic operation sets (204) may contain multiple access-equivalent operation sets (206), each consisting of an access-equivalent opcode set along with its access-equivalent RS-tuple. Such operations need to be further bound down to a single access-equivalent operation set. This is done by the pre-pass operation binding phase. The constraint that must be satisfied is that each operation in the computation graph has to be annotated with an access equivalent operation set in such a way that, for every variable, the intersection of the access-equivalent register sets imposed upon it by all of the operations that access it, called its access-equivalent register option set, must be non-empty.

Scheduling—The scheduling phase is one of the main phases of an EPIC code generator. For each operation, the scheduler decides the time at which the operation is to be initiated. It also determines which compiler-opcode is to be used as well as the reservation table and latency descriptor that are used by the operation, i.e., it picks a specific alternative. In the case of statically scheduled EPIC machines, the scheduling phase refines access-equivalent operation sets (206) to opcode-qualified operation sets (208), i.e., operations in which the possible alternatives have been narrowed down to a particular one, as a consequence of which the opcode options have been narrowed down to a single compiler-opcode, but the register options are unchanged.

Register allocation—The register allocation phase assigns a specific compiler-register to each of the virtual registers in the computation graph by selecting one of the compiler registers from the corresponding access-equivalent register set. This yields fully-qualified operations (212), i.e., a specific alternative and a specific compiler-register tuple.

The register allocation phase may introduce additional code to spill registers to memory. The spill code is fully-bound as far as the registers are concerned, but it has not been scheduled. Thus, after this phase, the program contains two types of operations. First, it contains operations that have been narrowed down to fully-qualified operations (212). Second, it contains spill operations whose operands are fully bound to compiler-register tuples, but whose opcodes are still at the level of access-equivalent opcode sets. We call such operations register-qualified operation sets (210).

Post-pass scheduling—A second pass of scheduling, called post-pass scheduling, is used to schedule the spill code introduced by the register allocator. This phase has a choice for the scheduling of fully-qualified operations (212): it can either keep the opcode bindings selected by the earlier scheduling phase or it can start afresh by reverting all compiler-opcodes back to their original access-equivalent opcode sets thereby converting them to register-qualified operations (210). The latter strategy gives more freedom to the scheduler in accommodating the spill code and yields better schedules. Post-pass scheduling deals with code containing virtual registers that are fully bound to compiler-registers. It is greatly constrained, therefore, by a host of anti- and output dependences. However, since the register assignments were made subsequent to the main scheduling phase, they are already sensitive to achieving a good schedule.

Code emission—The final phase is the code-emission phase. This phase converts fully-qualified operations to architectural operations. This is a bookkeeping step and no decisions are made by this phase.

Extracting the MDES

Mini-MDES Components

In order to facilitate MDES extraction directly from the datapath components, each macrocell in the macrocell database carries a mini-MDES which records the MDES-related properties shown above for the architectural opcodes that it implements. The mini-MDES is organized just as described above except that it contains only one level of the operation hierarchy, the architectural level, and that there are no registers and register descriptors. Instead, the operation format of an architectural operation is described in terms of the input/output ports of the macrocell used by each of its operands.

For each operand of a given operation, the mini-MDES also records the internal latency through the macrocell. If the macrocell is a hard macro, the latency may be accurately modeled as absolute time delay (nanoseconds), or in case of soft macros, approximately as the number of clock cycles relative to the start of the execution of the operation.

For each operation, the mini-MDES records any shared internal resources (e.g. output ports, internal buses) and their time of use relative to the start of the execution in an internal reservation table. This table helps in modeling internal resource conflicts and timing hazards between operations. For example, if a macrocell supports multiple operations with different output latencies that are channeled through the same output port, there may be an output port conflict between such operations issued successively to this macrocell. Recording the usage of the output port at the appropriate time for each operation allows the compiler to separate such operations sufficiently in time so as to avoid the port conflict.

Finally, the mini-MDES of a macrocell also reflects whether the macrocell implements speculative and/or predicated execution capability by incorporating such opcodes within itself. The macrocell selection process may choose macrocells based on the presence or absence of such capabilities. Note that a macrocell supporting speculative execution and/or predicated execution may be used in place of one that does not, but its cost may be somewhat higher.

Extracting Global MDES From the Datapath

The MDES extractor extracts a compiler-centric machine description from the datapath of the machine. It collects the information contained in the mini-MDESes of the various functional unit macrocells and the MDES-related properties of the register files present in the datapath into a single global MDES. It then augments the extracted MDES with the topological constraints of the datapath such as connectivity to shared buses and register file ports. A pseudocode listing illustrating the implementation of the process of extracting the MDES from the datapath is provided below.

Likewise, for register file components of the datapath, the extractor installs the various architectural registers as compiler registers into the global MDES to form the lowest level of the register hierarchy along with a register descriptor (line 30, FIG. 3, 308) that records the structural properties of the register file. Most of these properties are determined either from the type of the hardware component used (e.g., whether or not speculative execution and/or rotating registers are supported), or from its structural instance parameters (e.g., the number and bit-width of static and rotating registers). A few remaining properties are carried forward from the archspec (e.g., the virtual file type).

The MDES-related details of the operations implemented by a functional unit macrocell are collected as follows. For each input or output operand of a machine operation, the extractor collects a set of "operand alternatives". This set is obtained by first mapping the operand to its corresponding macrocell port at which it is received or produced (method call OperandToMcellPort at line 14), and then traversing the datapath components connected to that port (procedure call TraversePort at line 17). Operands mapped to the same port share the same alternatives and hence datapath traversal

```
Procedure ExtractMdes (Datapath dpath)
1:      Mdes globalMdes = nullMdes;
2:      for (component ε dpath) do
3:              if (component is a FU macrocell) then
4:                      PortAltMap altMap = nullMap;
5:                      Mdes miniMdes = component.MiniMdes();
6:                      //accumulate the mini-Mdes operations into the global mdes
7:                      for (operation ε miniMdes) do
8:                              CompilerOpcode opcode = a copy of operation.opcode();
9:                              globalMdes.InstallOpcode(opcode);
10:                             for (each input/output operand of operation) do
11:                                     OperandAlts opdAlts = nullList;
12:                                     ReservationTable opdResv = nullTable;
13:                                     OperandLatency lat = a copy of operation.OpdLatency(operand);
14:                                     McellPort port = operation.OperandToMcellPort(operand);
15:                                     //accumulate mdes properties by traversing the datapath from this port
16:                                     if (this port has not been traversed before) then
17:                                             TraversePort(port, lat, opdResv, opdAlts);
18:                                             // save operand alternatives for this port
19:                                             altMap.bind(port, opdAlts);
20:                                     else
21:                                             opdAlts = altMap.value(port);
22:                                     endif
23:                                     opcode RecordOperandAlternatives (operand, opdAlts);
24:                             endfor
25:                             //build operation alternatives as a cross product of operand alternatives
26:                             opcode.BuildOperationAlternatives(operation);
27:                     endfor
28:             elseif (component is a register file) then
29:                     //accumulate register file properties into the global mdes
30:                     globalMdes.InstallRegisterFile(component);
31:             endif
32:     endfor
33:     //build a hierarchy of operation alternatives for each semantic operation
34:     BuildOperationHierarchy(globalMdes);
35:     return globalMdes;
```

Figure 3:
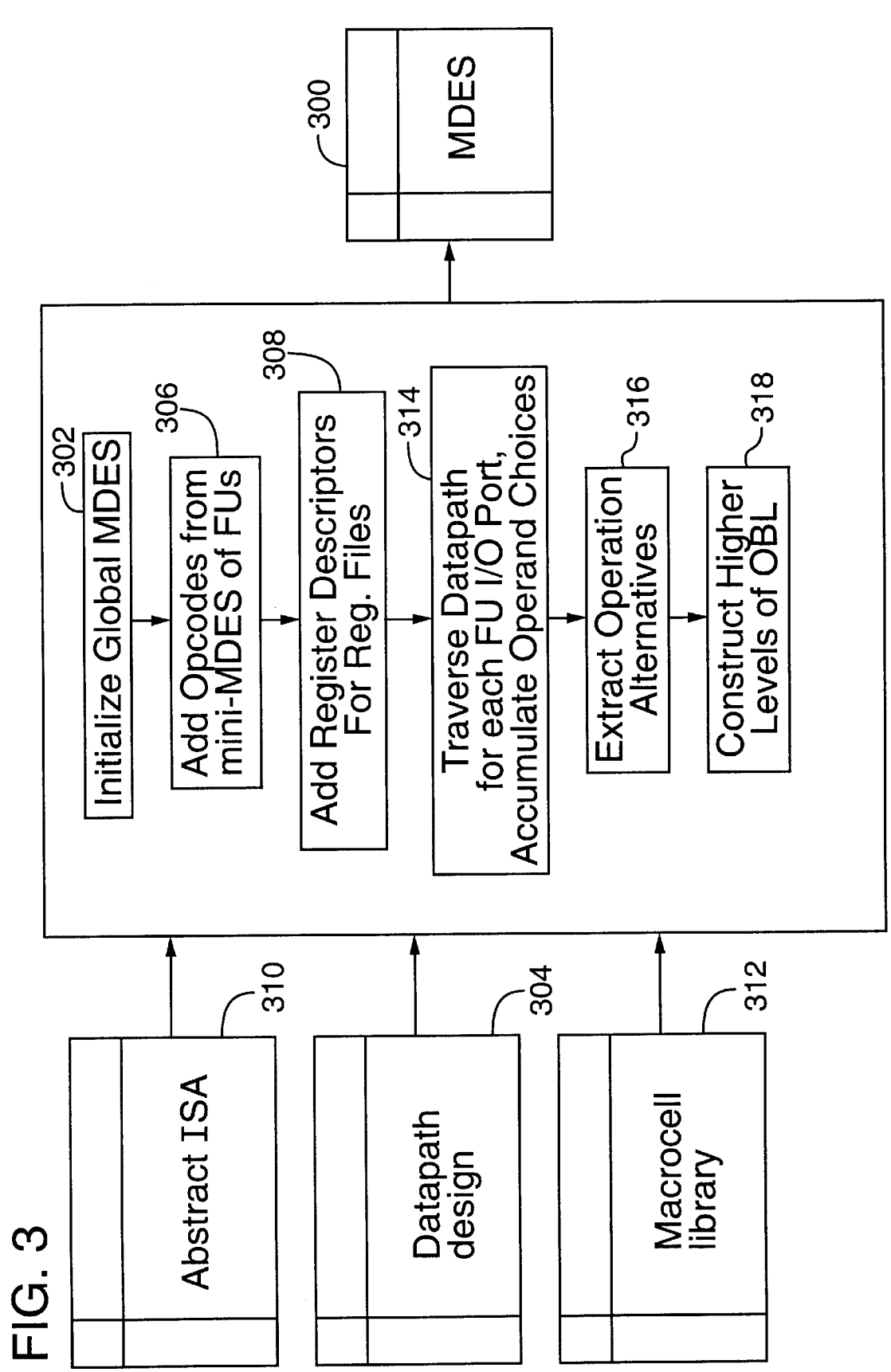
FIG. 3 is flow diagram illustrating the operation of an MDES extractor.

The extraction process starts by initializing the global MDES of the machine to an empty MDES (line 1, FIG. 3, 302). Then, for each component of the datapath (304) that is a functional unit macrocell, the extractor installs its mini-MDES architectural opcodes as compiler opcodes within the global MDES to form the lowest level of the opcode hierarchy (line 9, FIG. 3, 306). Various semantic and structural properties of the opcode including semantic opcode name, commutativity, associativity, number of input and output operands, bit encoding are also copied into the corresponding opcode descriptor.

needs to be performed only once per port. The details of this traversal and the generated operand alternatives are provided later.

The sets of operand alternatives so obtained are then combined into "operation alternatives" (method call BuildOperationAlternatives at line 26) (FIG. 3, 316). This is done by taking each tuple in the Cartesian product of the sets of operand alternatives for the given operation and combining its operand properties to form operation properties. The operand field types are concatenated to form an operation format, individual operand latencies are collected to form the complete operation latency descriptor, and the operand reservation tables are unioned together with the internal reservation table of the operation into an overall reservation table for that operation alternative. As described below, the field types of the various operand alternatives partition the compiler registers of the machine into access-equivalent register sets. Therefore, the operation alternatives formed above correspond to an opcode-qualified compiler operation consisting of a compiler opcode and a set of access-equivalent register-set tuples. All such distinct operation alternatives are installed into the global MDES as alternatives for the given compiler opcode.

be different for different sources reaching this port or even for the same sources reachable via different paths.

3. The operand reservation table, which identifies any shared resources used for accessing this operand (e.g., buses and register file ports) and their time of use relative to the issue time of the operation.

The strategy for collecting the operand alternatives for a given macrocell port is as follows. The operand latency of the various alternatives is initialized using the macrocell mini-mdes and their reservation table is set to empty. Starting from the macrocell port, the extractor then traverses the various datapath components connected to it in a depth-first

```
Procedure TraversePort(McellPort thisport, OperandLatency lat, ReservationTable resv,
OperandAlts opdAlts)
1:     //Assume one-to-one connections among ports
2:     if (thisport is INPUT port) then
3:             case (predecessor component connected to thisport) of
4:             multiplexor: //accumulate all field type choices
5:                     for (each inputport of the multiplexor) do
6:                             TraversePort(inputport, lat, resv, opdAlts);
7:                     endfor
8:
9:             de-multiplexor: //add a resource column to reservation table
10:                    Resource res = Resource(inputport of the de-multiplexor);
11:                    ReservationTable resv' = resv.AddColumn (res,lat);
12:                    TraversePort(inputport, lat, resv', opdAlts);
13
14:            pipeline latch: // add one to latency
15:                    Identify inputport of the latch;
16:                    ReservationTable resv' = resv.AddRow(lat);
17:                    OperandLatency lat' = lat.AddLatency(1);
18:                    TraversePort(inputport, lat', resv', opdAlts);
19:
20:            register/literal file: // base case
21:                    FieldType ftype = FieldType(file.Registers());
22:                    Resource res = Resource(outputport of the register file);
23:                    ReservationTable resv' = resv.AddColumn(res, lat);
24:                    opdAlts.addAlt(ftype, lat, resv');
25:            endcase
26:    else //thisport is OUTPUT port (symmtric case)
27:
28: endif
```

Datapath Traversal

An important aspect of the above MDES extraction scheme is the datapath traversal routine TraversePort shown in pseudocode form above which extracts the operand alternatives associated with a given functional unit macrocell port. We only show the input port traversal since it is symmetric for output ports. For simplicity, we also assume that only one-to-one connections exist between the input and output ports of various datapath components, i.e., multiple sources to an input port are connected via a multiplexor, and multiple sinks from an output port are connected via a de-multiplexor. It is straightforward to extend this to many-to-many connections by treating such connections as multiple sources multiplexed onto a bus that are de-multiplexed to the various sinks.

Each operand alternative is a triple consisting of the following information that characterize the macrocell port and the hardware structures surrounding it:

1. The field type of the operand, which describes a set of compiler registers that are the potential sources of the operand and that are equally accessible from the input port.

2. The operand latency descriptor, which contains the earliest and latest sampling latencies of the operand with respect to the issue time of the operation. This may traversal until an operand source such as a register file or literal instruction field is reached. As hardware components such as multiplexors, de-multipelxors, pipeline latches and registers files are encountered during the traversal, their effect is accumulated into the operand latency and the reservation table as described below.

A multiplexor (line 4) at the input port serves to bring various sources of this operand to this port and therefore represents alternate field types and latency paths leading to different operation alternatives. The MDES extractor performs a recursive traversal for each of the inputs of the multiplexor.

The effect of a demultiplexor (line 9) at the input is to distribute data from a shared point (such as a shared input bus) to various macrocell ports. This is modeled by introducing a new resource column in the reservation table corresponding to this shared data source. A check is placed at the current latency row to show that this new resource is used at that latency. The input of the demultiplexor is followed recursively.

A pipeline latch (line 14) encountered during the traversal adds to the sampling latency of the operand as well as affects the operation reservation table by adding a new row at the beginning. The input of the latch is recursively traversed to identify the source of the operand.

Finally, a register file port or a literal instruction field (line 20) is the point where the recursion terminates. All of the registers (literals) accessible via the register file port (literal field) form an access equivalent register set and become part of the field type of the operand. The register file port (literal field) itself is recorded as a shared resource being accessed at the current latency by adding a resource column to the current reservation table. The triple consisting of the field type, the operand latency, and the reservation table is accumulated into the list of operand alternatives for this macrocell port.

Building Operation Hierarchy

The final step in the MDES extraction process is to complete the higher levels of the opcode, register and operation hierarchy within the global MDES (procedure call BuildOperationHierarchy at line 34 of the ExtractMDES pseudocode). This process constructs the higher levels of the operation binding lattice (OBL)(FIG. 3, 318).

The process of constructing operand alternatives shown above already identifies the compiler registers, and the access-equivalent register sets. In order to complete the register hierarchy, all distinct access-equivalent register sets implementing a particular data type (e.g., floating point, integer, and boolean) are collected to form a generic register set which implements the semantic notion of a virtual register in the program.

Next, the corresponding levels in the opcode hierarchy are constructed using the register hierarchy. First, all compiler opcodes implementing the same semantic opcode (as identified by its opcode property) are collected into a generic opcode set which forms the top layer of the opcode hierarchy. Any operation alternative pointed to by a compiler opcode within this generic opcode set is a valid implementation of the corresponding semantic operation. However, not all such alternatives are equivalent in terms of their operand accessibility. Therefore, the set of operation alternatives pointed to by a generic opcode set is then further partitioned into sets of access-equivalent alternatives that use the same access-equivalent register-set tuples. The compiler opcodes present in each such partition form a distinct access-equivalent opcode set which constitutes the middle layer of the opcode hierarchy.

Finally, the missing layers of the operation hierarchy, i.e., generic operation sets, access-equivalent operation sets, and register-qualified operation sets may be built using the corresponding layers of the opcode and the register hierarchies. In the current implementation, these layers are not directly represented, instead they are implicitly referenced via the opcode hierarchy.

Extracting MDES From the Abstract ISA

The MDES may also be extracted from the abstract ISA specification provided in the ArchSpec. While the ArchSpec does not provide a structural representation of the datapath, it does provide the opcode repertoire, the I/O format of each opcode, and the ILP constraints among the operations. The ILP constraints can be used to extract abstract resource constraints needed to re-target the compiler. For instance, an exclusion set may be thought of as representing an abstract processor resource shared by each opcode in the exclusion set.

Simple pipelined reservation tables may be constructed for each opcode using such shared abstract resources as if they represented a functional unit instance used at cycle 0. An assumed latency is assigned to each operand of an opcode rather than extracting actual latency information from the mini-MDES of a macrocell.

The MDES extracted in this manner is accurate only with respect to the opcode repertoire, the I/O format and the operation issue constraints imposed by the ArchSpec and may only be used as a functional approximation to the complete MDES extracted from the datapath. In particular, it does not model any structural or timing hazards arising from the physical resources of the machine. This is still useful, for example, in application specific processor design where a quick retargeting of the compiler is needed to arrive at a desired abstract instruction set architecture or customized instruction templates, and the final MDES extraction and compilation may be postponed until after the processor datapath has been designed.

Another possibility is to superimpose the MDES extracted from the ArchSpec and the datapath. In this approach, the MDES is constructed in two phases:

1) Phase one extracts the MDES from the ArchSpec, possibly before the datapath is constructed; 2) Phase two augments the MDES produced in phase one with physical resource conflict constraints obtained from a traversal of the structural datapath representation. This has the advantage of taking the issue-time ILP constraints into account as well as derive the physical resource constraints based on actual latencies obtained from the mini-MDES of the macrocells.

Extracting MDES From the Control Path

Another way to account for the issue-time ILP constraints is to perform a traversal of the structural control path representation. The control path representation reflects issue time ILP constraints because it is constructed based on the instruction format, which in turn, represents the issue time ILP constraints in the instruction templates. The process of extracting the issue-time ILP constraints from the control path is explained further below.

Modeling Resource Conflicts in the MDES

Resource conflicts depend not only on the interconnections of the functional units specified in the datapath design but also on the time at which the resource is required. The processor's clock controls the timing of the functional unit's execution of an opcode as well as the transfer of data into and out of the functional unit. The execution latency of an opcode may be expressed as the number of clock cycles between issuance of the operation for execution and the time at which the results are available for a subsequent operation. Stated another way, the execution latency is the time in processor cycles between the reading of an operation's inputs and the writing of its output(s) to a result register. Depending on the relative importance or complexity of an opcode, the action associated with the opcode can be fully pipelined (i.e., a new opcode can be issued every clock cycle), be partially pipelined (e.g., a particular opcode can take multiple clock cycles to complete, but a new opcode can be started before completion of a previously issued opcode), or not pipelined at all. In some compiler/processor combinations, the compiler may assume an execution latency that is different than that of the underlying hardware and schedule operations based on this assumed latency. In this case, the processor may have to stall issuance of an operation to ensure that its inputs will be available when it is executed.

Some processors provide a sequential program interface in which an assumed latency of every operation (or, in this case, every instruction) is one (clock cycle). This permits each operation to use the result of a previous operation as one of its input operands. Such execution semantics are referred to as unit assumed latency (UAL). EPIC processors do not require UAL, and latencies are not constrained to be one clock cycle. The MDES extractor is sufficiently general to support cases where the execution latency may be one or more cycles and where the assumed latency is not equal to the actual latency.

MDES Extraction Examples

Figure 4:
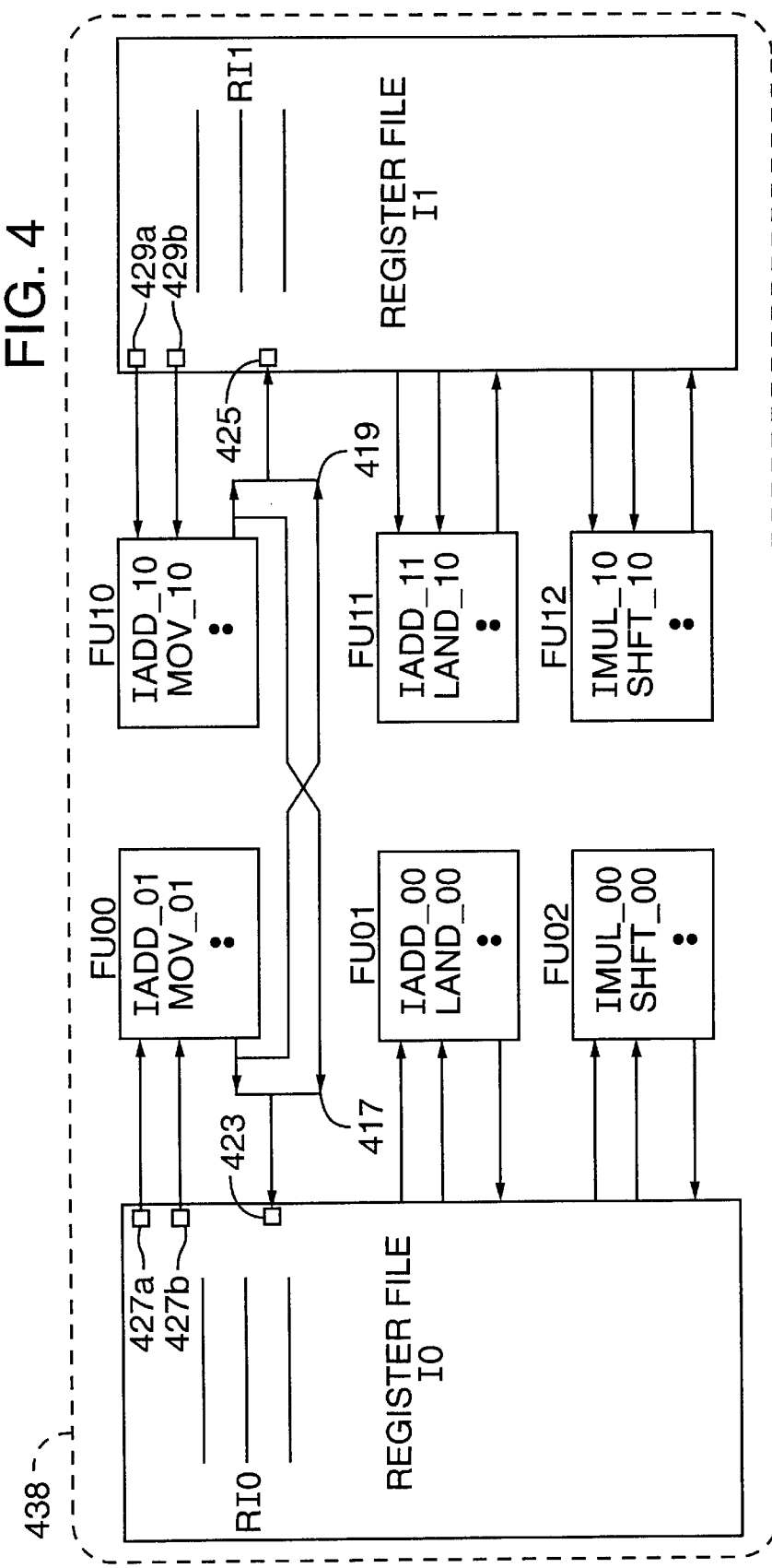
FIG. 4 is an example of a processor datapath.

FIG. 4 depicts an example of a structural datapath for which the MDES extractor may programmatically extract I/O formats and resource sharing constraints. The datapath 438 includes a number of functional units FU00, FU01, FU02, FU10, FU11, FU12 (referred to as FU00–FU12), which enable the processor to execute operations concurrently subject to their resource sharing constraints. For example, some operations execute on distinct functional units yet share the same register file ports. The processor cannot issue these operations such that they use the shared resource at the same time. The functional units FU00–FU12 depicted in FIG. 4 are simply examples, and in general, an EPIC processor can have more or fewer functional units, and the functional units can execute additional types of opcodes.

The functional units FU00, FU10, FU01, FU11 execute integer add operations (IADDs) and functional units FU02, FU12 execute integer multiply operations (IMULs). Each of the functional units FU00–FU12 also execute other operations. For example, the functional units FU00, FU10 execute an integer move (IMOV) operation, the functional units FU01, FU11 execute a logical AND (LAND) operation, and the functional units FU02, FU12 execute a shift (SHFT) operation. Subject to resource sharing conflicts, FU00 may execute an integer move (IMOV) operation while FU10 concurrently executes an ADD operation. In addition, for a selected operation there are generally several functional units available. For example, any of the functional units FU00, FU11, FU01, FU10 can execute an integer add (IADD) operation.

The opcode repertoire describes the operations available in the functional units FU00–FU12, but does not associate sources of input operands or destinations of results with the functional units FU00–FU12. For example, the opcode IADD_01 of the functional unit FU00 specifies an integer addition but does not specify the sources of the integers to be added or destination of the result. Referring to FIG. 4, input operands (input data) for the functional units FU00–FU12 are provided from various registers such as RI0, RI1 of register files I0, I1. Output data (results) are written to the register files I0, I1 as well. The number of registers RI0, RI1 provided is large enough so that register spill is infrequent. Most operands are stored in a register after an initial load from memory and the results of an operation are directed to a register and then stored in memory.

The table in FIG. 5 shows the I/O format extracted for the datapath shown in FIG. 4. The MDES extractor produces a composite I/O format for the processor such as the example shown in FIG. 5 and then builds upon the I/O format to create the operation hierarchy. Initially, the MDES extractor provides the bottom level of the operation hierarchy, namely the architectural operations. It then builds the higher levels of the operation binding lattice from the bottom up as described above.

FIG. 5 represents the I/O format in the form of a table listing the opcodes and the associated source and destination register files for the functional units FU00–FU12. The set of opcodes and associated input and output registers (or other sources or destinations) together form the processor I/O specification. In FIG. 5, the association of register files and opcodes are written in terms of legal register tuples, i.e., the allowable combinations of registers that are jointly accessible from an opcode. The notation {I0} refers to every register in register file I0. The notation {I0}×{I1} refers to a Cartesian product. For example, the first row of the table of FIG. 5 means that every register tuple of the Cartesian product {I0}×{I0}×{I0} is legal for the op code IADD_00.

The processor I/O specification of FIG. 5 does not fully describe resource conflicts between the functional units FU00–FU12. For example, referring again to the datapath 438 of FIG. 4, the functional units FU00, FU10 receive and supply data to the register files I0, I1 through register ports 423, 425, 427, 429. In some cases, data ports of the functional units share register ports. In these cases, interconnection components such as multiplexors or tristate buffers are used to allow two or more functional unit data ports to read or write form a single register port or to allow a single functional unit data port to read or write from two or more register ports. For example, multiplexors (MUXes) 417, 419 each receive the output of both the functional units FU00, FU10 and share the register ports 423, 425, respectively. While FU00 writes an output of an IMOV_01 operation into the register file I1 via write port 425, the functional unit FU10 cannot simultaneously use write port 425. The compiler must schedule operations so that such port conflicts are avoided. In addition, the existence of a port conflict depends on the latency of an opcode. For example, the functional unit FU00 requires register file port 423 to write a result to the register file I0. However, the port 423 is required after the inputs are supplied to the functional unit FU00. Depending on the latency of the opcode executed, the port 423 may not be required until many clock cycles have elapsed.

The tables illustrated in FIGS. 6A–6D serve as an example to illustrate how the MDES extractor determines resource sharing constraints during a structural traversal of the datapath. These tables specifically refer to operations mapped to the functional units FU00 and FU10. For the sake of this example, we refer specifically to operations IADD_01 and IADD_10 on these functional units. The top row of each table lists a hardware resource in terms of its reference number shown in FIG. 4.

In the structural traversal of the datapath for FU00, the MDES extractor determines that the IADD_01 operation samples register ports 427a, 427b at cycle 0 and produces a result at either register port 423 of I0 or port 425 of I1. This choice of output ports gives rise to the two operation alternatives shown in FIGS. 6A and 6B. In both operation alternatives, the operation samples the input port at cycle 0. Since the operation may use either of two output port choices, the MDES extractor creates distinct tables, one reflecting use of port 423 at cycle 1 and another reflecting use of port 425 at cycle 1.

The tables in FIGS. 6C and 6D show similar operation alternatives for the operation IADD_10.

The scheduler uses the resource sharing constraints extracted from the datapath traversal to build a composite reservation table. FIG. 6E, for example, shows a composite reservation table for operations IADD_01 and IADD_10 with each of the corresponding resources added as columns in the composite table. During the scheduling process, the resource reservation tables provide operation alternatives subject to additional constraints provided in the operation binding lattice. Based on the reservation tables, the scheduler could schedule IADD_01 and IADD_10 to begin execution in cycle 0 so long as they use different output ports, such as 423 and 425. The operation binding lattice may include additional constraints that cause the scheduler to select only the IADD_01 operation to issue in cycle 0. The resulting composite reservation table shows that the IADD_01 operation issues in cycle 0 using ports 427a and 427b and writes a result to port 423 in cycle 1.

Figures 7, 8A, 8B:
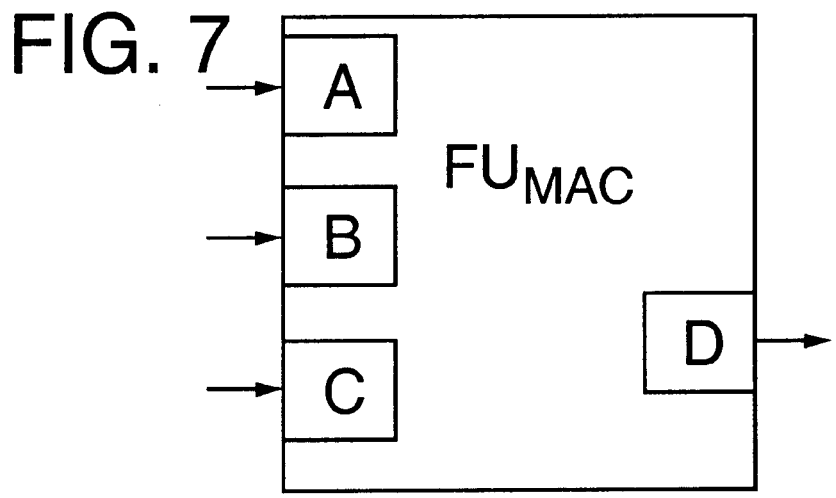
FIG. 7 is a block diagram of a functional unit that executes a multiply-accumulate (MAC) opcode.
FIG. 8A is a reservation table for a MAC operation of the functional unit shown in FIG. 7.
FIG. 8B is a reservation table for a MULTIPLY operation in the functional unit shown in FIG. 7.

In the process of determining resource sharing constraints, the MDES extractor records the external resource conflicts of the datapath components as illustrated above as well as the internal resource sharing conflicts represented in the mini-MDES of the functional units. To help explain these internal resource sharing conflicts, FIGS. 7 and 8A–B illustrate a multiply-accumulate (MAC) functional unit $FU_{MAC}$ along with reservation tables for a MAC operation (FIG. 8A) and a MULTIPLY operation (FIG. 8B). Referring to FIG. 7, the functional unit $FU_{MAC}$ receives inputs A, B, C, and produces an output D=A*B+C. The MAC opcode requires several clock cycles to complete. In cycle 0, the functional unit $FU_{MAC}$ samples inputs A,B. In cycle 1, the functional unit samples input D and produces a product A*B. In cycle 2, the functional unit produces the MAC result A*B+C. A total of three clock cycles are required to obtain the output D of the functional unit $FU_{MAC}$. The resource reservation table in the mini-MDES indicates the input and output ports that the operation uses as well as their time of use relative to the issue time as shown in FIG. 8A.

In some cases, operations mapped to a functional unit may use the same internal ports at the same time, at different times, or use distinct ports. The mini-MDES provides resource reservation tables for such operations. For example, the reservation table for the MULTIPLY operation shown in FIG. 8B shows that this operation samples inputs A, B at cycle 0 and produces a result at port D at cycle 1. From the resource reservation tables, the scheduler may determine, for example, that it is permissible to issue a MAC operation to the functional unit in successive cycles. However, it is impermissible to issue a MULTIPLY operation one cycle after issuing a MAC operation because there would be a conflict for the use of port D.

As described above, the MDES extractor prepares the reservation tables by structurally traversing the datapath to identify both internal and external resource sharing constraints. Another example of such a structural traversal is illustrated with reference to a datapath 850 of FIG. 9. The datapath 850 includes structural descriptions of functional units 872A, 872B, a register file 870, and interconnections between the functional units 872A, 872B and the register file 870, as well as other macrocells. The MDES extractor obtains reservation tables for the functional unit macrocell instances from the macrocell library. The MDES extractor then programmatically synthesizes the latency specification. Connections to/from a given functional unit are determined using the structural description for the processor datapath. The connections of the inputs and the outputs of the functional units are traversed along the buses and wires specified in the datapath until a register file port or literal file port is reached. The connectivity of all the functional units is similarly determined by structurally traversing the wire interconnect toward a register file port or a literal file port.

The two functional units 872A, 872B may share a single register file port directly (such as port dr1), or a single function unit input (such as port i1 of 872A) may obtain its input from both a register file port (such as port d 0) and a literal file port using a multiplexor (MUX), as selected with a control input (ctrl) 882b. Structural traversal of the functional units proceeds through the MUXes to a register file or literal file represented by a sign-extension unit 876. If a MUX output is directed to an input port of a functional unit, all the inputs to the MUX are considered as alternatives. Conversely, for a DEMUX input from an output port of a functional unit, all the outputs of the DEMUX are considered as alternatives and traversed (not shown).

The datapath 850 illustrates several potential resource conflicts and choices. The data inputs of functional units 872A, 872B are connected to output (read) ports dr0, dr1 and the data output is connected to an input (write) port dw0 of the register file 870 via interconnect buses 874a–c. The opcode repertoire of functional unit 872A includes opcodes LAND, IADD; input data for these opcodes is supplied at functional unit input ports i0, i1. The port i0 receives data from the port dr1 of the register file 870 via the interconnect bus 874b. The port i1 receives input data from either the port dr0 or a literal input from a sign-extend macrocell instance 876 as selected by a control input (ctrl) 882b to a MUX 878. The output of the functional unit 872A is driven onto the interconnect bus 874c by a tristate buffer 880a in response to a control input 882a.

The opcode repertoire of the functional unit 872B includes the opcode SQRT, (square root) which receives an input at an input port i0 from the port dr1 of the register file 870. The output of the SQRT opcode is delivered to the input port dw0 of the register 870 file through a tristate buffer 880b that is controlled by the control input 882c. The functional units 872A, 872B both receive data from the port dr1 of the register file 870 and write data to the port dw0 of the register file 870. Therefore, the functional units 872A, 872B share the ports dr1, dw0. The tristate buffers 880a, 880b are provided to prevent the functional units 872A, 872B from supplying their outputs to the bus 874c simultaneously.

Figure 9:
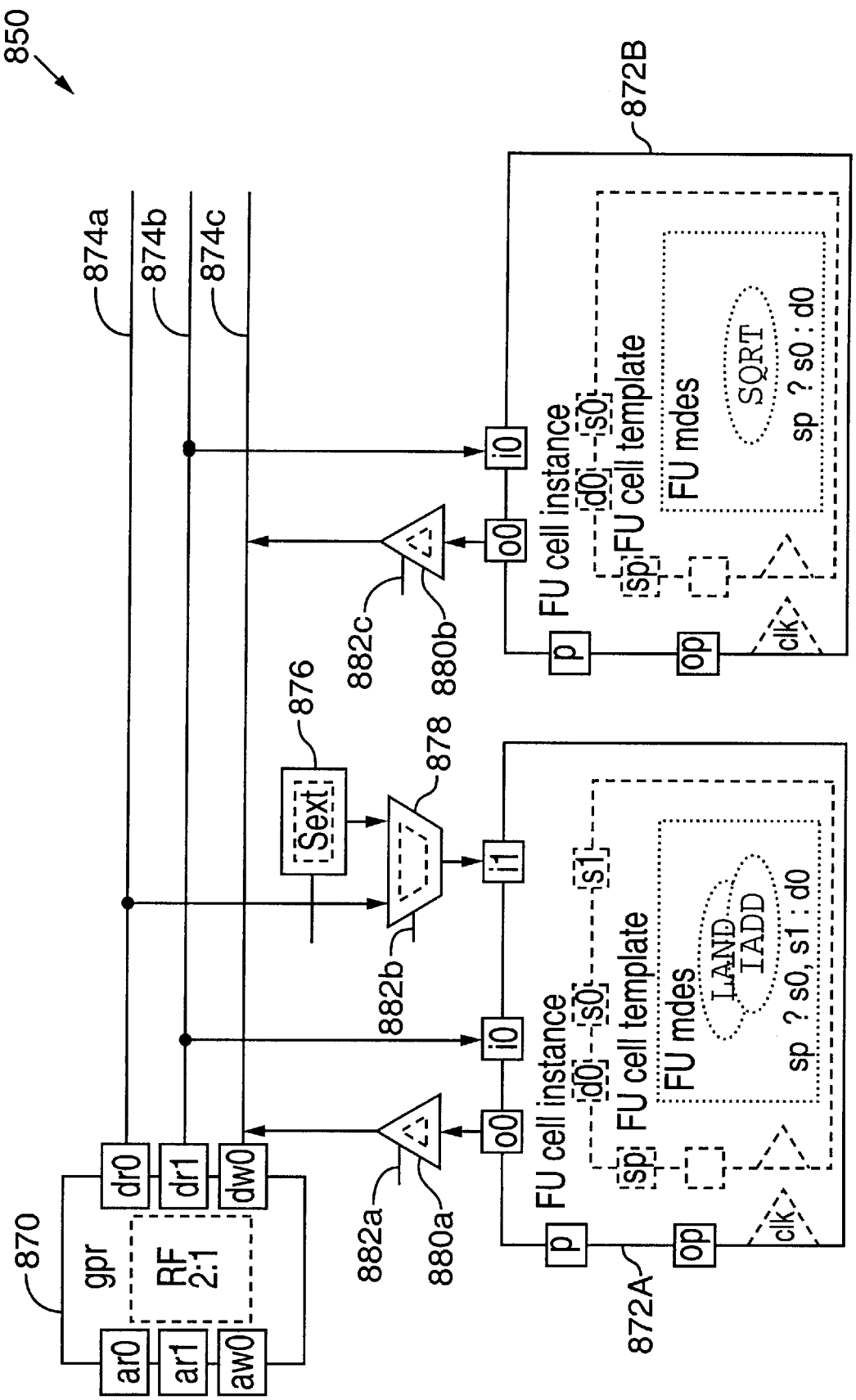
FIG. 9 is another example of a processor datapath.

To begin extraction of the MDES using the datapath shown in FIG. 9, the MDES extractor structurally traverses the interconnections of the functional units 872A, 872B. The operation group mapped to ALU instance 872A contains two operations, LAND (logical and) and IADD (integer add). The operation format for these operations stored within the mini-MDES shows the macrocell ports used for their various operands. The mini-MDES also records the sampling and production times of the various input and output operands that is intrinsic to the macrocell. Let us suppose that it is 0 for each data input s0 and s1, 1 for the predicate input sp, and 2 for the data output d0 (assuming that the macrocell is pipelined). Finally, the mini-MDES records that these operations execute on the same macrocell and share its computation resources. This is represented by an internal reservation table with a shared "ALU" resource for the two opcodes used at cycle 0 assuming that the macrocell is pipelined.

The datapath traversal starts from the actual input and output ports of the macrocell instance 872A. Following input port i0, we find that it is directly connected to the gpr register file port dr1, introducing a shared resource column for that register port to be used at cycle 0, which is the sampling latency of this input operand. The field type acessible via this port is denoted by "gpr" which stands for all the registers contained in the register file gpr 870. This operand alternative is recorded temporarily.

The input port i1 of the macrocell instance is connected via a multiplexor 878 to the gpr register file port dr0 as well as a sign-extender 876 for the short literal instruction field. This gives rise to two distinct operand alternatives, one with field type "gpr" at latency 0 using the gpr file port dr0, and the other with field type "s" at latency 0 using the literal instruction field connected to the sign-extender. Similarly, the predicate input gives rise to the operand alternative with field type "pr" at latency 1 using the pr file port (not shown), and the destination port o0 gives rise to the operand alternative with field type "gpr" at latency 2 using the gpr file port dw0. The various operand alternatives are combined to form two distinct operation format and reservation table combinations for the ALU macrocell, as shown in FIGS. 10A and 10B.

Note that the overall latencies of the operands are the same as the intrinsic macrocell port usage latencies since there are no external pipeline latches. Also, the ALU resource is marked as being used only at cycle 0 since the macrocell is pipelined and the usage of subsequent stages of the ALU pipeline at subsequent cycles is implicit. The above combinations of operation formats, latencies, and reservation tables apply to both IADD and LAND opcodes, thereby forming two distinct operation alternatives each. These alternatives would be combined with other alternatives from other macrocells to give rise to the complete operation hierarchy for these opcodes.

In its structural traversal, the MDES extractor also prepares a reservation table for the functional unit 872B. This reservation table is illustrated in FIG. 11. An internal reservation table is extracted from the macrocell library. For purposes of illustration, the SQRT unit is assumed to be non-pipelined and have a latency of 4 clock cycles, i.e., an output is produced 4 clock cycles after an input is received. The fact that the unit is non-pipelined is reflected in the internal reservation table by keeping the "SQRT" resource busy for 4 cycles (see the column labeled SQRT in FIG. 11). The structural traversal of the datapath proceeds as before. The input i0 is followed to the register file 870, and a column 1023 added to the SQRT reservation table 1021. The output o0 is then traversed to the tristate buffer 880*b* and then to the port dw0. Corresponding column 1024 is then added to the SQRT reservation table 1021. Structural traversal of the functional unit 872B is complete.

At this point, the reservation tables for the functional units 872A, 872B are complete. The MDES extractor installs the resource conflict data included in the reservation tables on the respective opcodes within the MDES, completing MDES extraction.

Operation issue conflicts stemming from the instruction format may also be added to the above reservation tables in the following way. The MDES extractor repeats the above process after the instruction format for the target machine has been designed and the corresponding controlpath and instruction decode logic has been inserted (described in the Control path application referenced above). Now, the datapath traversal is carried through the register files back up to the instruction register treating the register files like pipeline latches. The latency of the register files may cause one or more rows to be added at the beginning of the reservation table automatically corresponding to instruction decode and operand fetch cycles. The traversal paths leading towards the same bit positions in the instruction register would end up recording an operation issue conflict.

Alternatively, one may directly represent the operation group exclusions prescribed in the ArchSpec as shared abstract resources that are used at cycle 0 and, therefore, model operation issue conflict for the mutually exclusive operation groups. The current implementation uses this approach since it is simpler than traversing the control path representation, and it de-couples the extraction of the MDES and its use in scheduling application programs from instruction format design and control path design processes.

Conclusion

Re-targeting a compiler based on an MDES permits adapting the compiler to a processor by changing the MDES. Processors vary widely in, for example, numbers and types of functional units, pipeline structure, latencies, the sets of opcodes executable by each functional unit, the number of register files, the number of registers per register file, the accessibility of the registers and register files from the various functional units, and the bus structure between the register files and the functional units. The contents of the MDES can be changed so that the compiler is retargeted to reflect these variations. Given the numerous variations and the complexity of the processor design, automatic MDES extraction is an important tool for the design and evaluation of EPIC processors. MDES extraction is described above based on a processor design that includes an abstract ISA specification, a datapath design, and a macrocell library. However, an MDES extractor can use a processor design that is organized in other ways. In addition, the processor design can include many additional features that are unrelated to the compiler (or the scheduler) and such features are irrelevant for the purpose of MDES extraction. The MDES extractor can be implemented as one or more application programs or modules, or can be integrated with a processor design system, so that a completed processor design includes an MDES for retargeting a compiler. In some applications, the MDES extractor extracts MDES data from the processor as part of processor design.

In view of the many possible implementations of the invention, it should be recognized that the implementation described above is only an example of the invention and should not be taken as a limitation on the scope of the invention. Rather, the scope of the invention is defined by the following claims. I therefore claim as my invention all that comes within the scope and spirit of these claims.

I claim:

1. A method for programmatically extracting a machine description of a processor for retargeting a compiler, comprising:

reading a datapath design for the processor, the datapath design including functional unit instances and interconnections of the functional unit instances;

extracting latency and internal resource information for operations of the processor executed in the functional unit instances;

structurally traversing the interconnections of the functional units to identify resource conflicts;

identifying register access equivalent sets of operand alternatives for operations of the processor utilizing at least the resource conflicts; and including the resource conflicts and the register access equivalent sets in the machine description in a form for retargeting a compiler.

2. The method of claim 1, wherein the resource conflicts are obtained as reservation tables for various operations to be executed on the functional unit instances.

3. The method of claim 1, wherein the datapath design includes register files and the structural traversal of a functional unit extends from a functional unit input or output port to a register file.

4. The method of claim 1, wherein the latency information for the functional unit instances is obtained from a macrocell library.

5. A computer readable medium, having a computer program for performing the method of claim 1.

6. A method of programmatically preparing a resource reservation specification for a processor, comprising:

reading a datapath design for the processor, the datapath design including functional unit instances and interconnections of the functional unit instances; and structurally traversing the datapath to accumulate resource requirements for the resource reservation specification suitable to re-target a compiler to the processor, wherein the resource reservation specification identifies by grouping sets of register access equivalent operand alternatives for ones of machine operations associated with said datapath design.

7. The method of claim 6 further comprising extracting latencies for operations to be executed on the functional unit instances from a macrocell library.

8. The method of claim 7, further comprising extracting operation formats for the functional unit instances of the processor.

9. A computer readable medium, having a computer program for performing the method of claim 6.

10. A method for programmatically preparing a reservation table for a functional unit of a processor, comprising:
   selecting at least one opcode executable by the functional unit;
   determining connections of the functional unit in a processor datapath; and
   structurally traversing the datapath for the selected opcode and identifying reservation requirements for the opcode, wherein the reservation requirements are grouped according to sets of register access equivalent operand alternatives for the selected opcode.

11. The method of claim 10 comprising obtaining a latencies for operations to be executed on the functional unit.

12. A computer readable medium, having a computer program for performing the method of claim 10.

13. A method for programmatically extracting a machine description for an explicitly parallel instruction computing processor, comprising:
   extracting an opcode repertoire and an instruction level parallelism specification from a processor specification;
   extracting numbers and types of functional unit instances from a datapath specification into the machine description;
   reading latencies and internal resource constraints for the functional unit instances from a macrocell library;
   generating a resource reservation specification that includes reservation tables for the opcodes and sets of register access equivalent operand alternatives for ones of the opcodes by structurally traversing the datapath design;
   including the resource reservation specification and the sets of register access equivalent operand alternatives in the machine description; and
   storing the machine description in a computer readable medium.

14. A computer readable medium, having a computer program for performing the method of claim 13.

15. A method for programmatically extracting a machine description for an explicitly parallel instruction computing processor, comprising:
   reading an abstract instruction set architecture specification for a processor, the specification including operations to be executed in the processor, instruction level parallelism constraints among the operations, and operation formats specifying inputs and outputs of the operations;
   determining resource sharing constraints among the operations based on the instruction level parallelism constraints;
   constructing a data structure representing resource sharing constraints for each of the operations, the data structure indicating at least an input and an output for an operation, a time of use of the corresponding input and output, and operand alternatives for the ones of the operations that are grouped according to register access equivalent constraints, the data structure forming at least part of a machine description for programmatically re-targeting a compiler.

16. The method of claim 15 further including:
   programmatically traversing a structural representation of a datapath for the processor;
   during the traversal determining external resource sharing constraints for each of the operations.

17. The method of claim 16 further including:
   during the traversal, extracting internal resource sharing constraints for operations to be executed on functional units in the datapath, the internal resource sharing constraints being extracted from a database for storing information about functional unit macrocells.

18. The method of claim 16 further including;
   superimposing the external resource sharing constraints obtained during the structural traversal with the machine description obtained from the abstract instruction set architecture.

* * * * *